June 19, 1962  C. H. HAY  3,039,443
MACHINE TOOL FEED APPARATUS
Filed Nov. 27, 1959  2 Sheets-Sheet 2
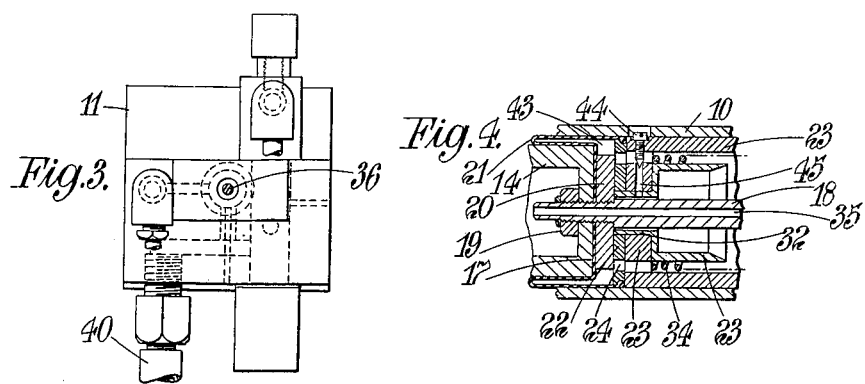

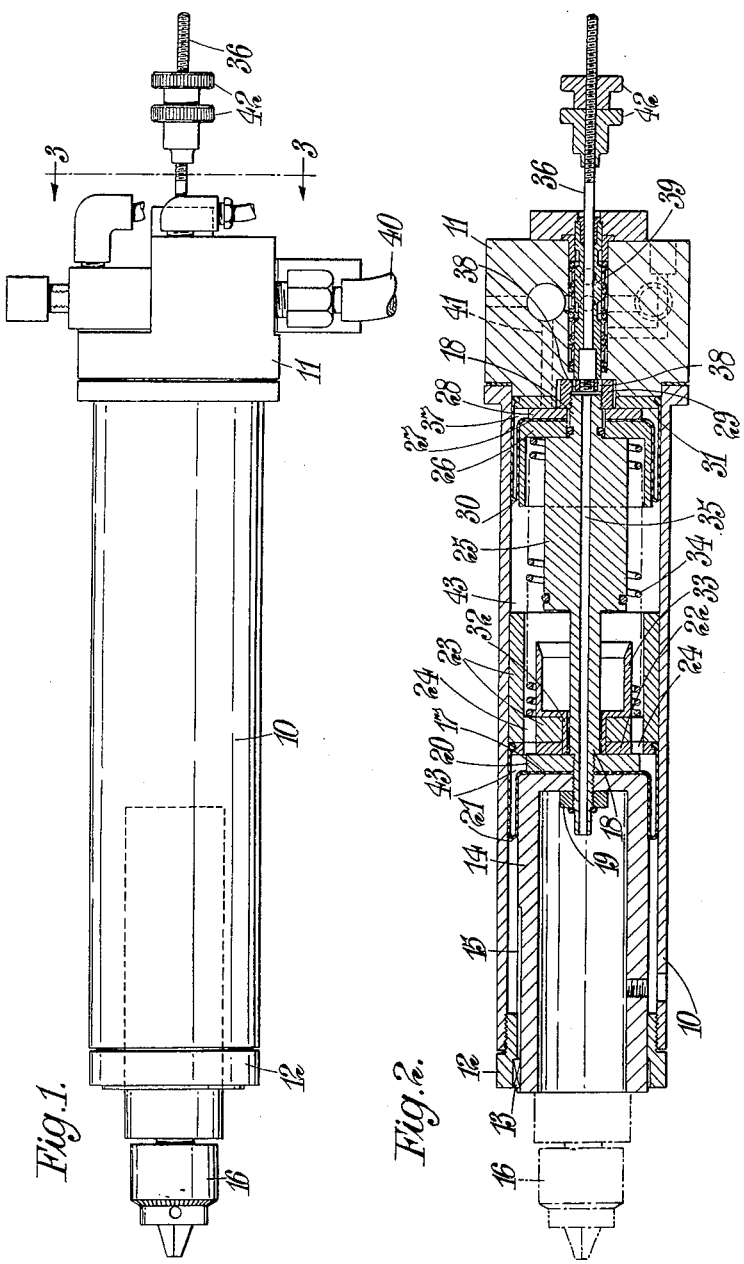

United States Patent Office 3,039,443
Patented June 19, 1962

3,039,443
MACHINE TOOL FEED APPARATUS
Claude Henry Hay, Dartford, England, assignor to Baldwin Instrument Company Limited, Dartford, England, a company of Great Britain
Filed Nov. 27, 1959, Ser. No. 855,900
6 Claims. (Cl. 121—48)

This invention relates to feed apparatus for the tool feed of a machine tool and has for its principal object to provide an improved form of fluid pressure operated tool feed.

The invention makes use of resilient rubber or plastic seals of deep cup-shaped form having a circular end face joined to another annular flange by a conical portion tapering outwardly from the end face to the flange. Such seals will hereinafter be referred to as seals of the type described. Seals of this type are sold, for example, under the name "Bellofram." With these seals, if the annular flange is fixed, substantial movement of the circular end face in the axial direction is possible since the conical portion can fold back on itself.

According to this invention, there is provided machine tool feed apparatus comprising a stationary cylinder, a piston reciprocable in said cylinder and arranged to carry the tool to be fed, a foldable cup-shaped seal of the type described operatively connecting the cylinder and the piston and constituting a wall of a chamber to receive fluid pressure to move the piston forwardly in the direction towards the work piece, and means for effecting return movement of the piston on the release of the said fluid pressure. The tool carrying means may hold a fixed tool, for example a broaching tool, which is operated solely by the linear feed movement, or it may carry a motor, for example an air-operated motor, for driving a rotary tool such as a drill or a milling cutter or a grinding wheel. By the use of a seal of the type described, it is possible to obtain substantial linear feed movement of the tool without the use of any sliding seals or piston rings. This arrangement furthermore facilitates the use of interchangeable tool carriers, for example interchangeable drill units having motors arranged to run at different speeds, since the complete tool carrying unit may be detached and replaced without having to interfere with the fluid pressure sealing system whilst avoiding any need for a separate piston and cylinder assembly for effecting movement of the tool.

It is convenient to arrange that the tool is carried in a member fixed to the inner end face of the aforesaid seal, and that the said chamber is situated in the stationary cylinder.

This apparatus is very conveniently used for an air-operated tool, for example a vane type air drill. In such a case, air pressure may be applied to said chamber for effecting feed of the tool and the piston may have a longitudinal bore communicating between the said chamber and a tool driving pneumatic motor carried by the piston, to convey operating pressure to said motor so long as the pressure is maintained in the chamber.

In one construction according to the invention, there is provided a piston assembly comprising two piston heads rigidly carried on a single piston rod with separate cup-shaped seals of the type described appropriated one to each piston head operatively connecting the latter to the cylinder and constituting betwen them a chamber, additional to the one specified above, which additional chamber is charged with fluid, and a stationary partition in said cylinder, located between the piston heads, and arranged to permit the fluid in the additional chamber to pass through it as the piston heads reciprocate. This partition may be arranged to offer variable resistance to the passage of the fluid through it, so as to control the speed of travel of the piston assembly. For instance, a passage by which the fluid passes through the partition may be controlled by an adjustable valve. Moreover whether or not this valve is employed, the partition may be formed on its face which is directed away from the tool, with a damping cup, the open end of which will be entered by an enlargement of the piston rod during the later part of the forward movement of piston assembly.

It is preferred to arrange that the supply of fluid pressure to move the piston assembly forwardly is controlled by a sleeve valve which is movable along the line of the path of the piston assembly and is engaged and reset at the end of each forward and each return stroke of the piston assembly by parts in or moving with the latter. If, at the end of the forward stroke of the piston assembly, this valve is moved into a position to release the fluid pressure which moves the piston assembly forwardly in the direction towards the work piece, the return movement of the piston assembly may be effected by a spring.

For a more complete understanding of the invention, there will now be described by way of example only and with reference to the accompanying drawings certain constructional forms of machine tool feed apparatus according to the invention. It is to be understood however, that the invention is not restricted to the precise constructional details set forth.

In these drawings:

FIGURE 1 is an outside elevation of the apparatus,

FIGURE 2 is a sectional plan view taken on the longitudinal axis of the apparatus and showing the tool carrier in chain lines, FIGURE 3 is a section on the line 3—3 of FIGURE 1, and FIGURE 4 is a detail sectional view corresponding with a part of FIGURE 2, but showing a modified construction.

Like reference numerals indicate like parts throughout the drawings.

The apparatus comprises a cylinder 10 which is secured to a valve block 11. At its end remote from the valve block 11, the cylinder is fitted with a flanged guiding member 12. This reaches inside the open end of the cylinder 10 to be screwed thereinto, and it carries an inwardly directed key 13. Nested inside the cylinder 10 is a tool carrier 14 which is a sliding fit in the interior of the guiding member 12 and which has a keyway 15 to receive the key 13 by which relative rotation between the cylinder 10 and the tool carrier 14 is prevented. Any suitable tool 16 may be received in the tool carrier 14.

The tool carrier 14 constitutes a piston to reciprocate in the cylinder 10, but it is not a sliding fit in the latter after the style of a normal piston. Instead, it has fixed to its end, one part 17 of a cup-shaped flexible seal of the type above described. The piston 14 is screwed on to a piston rod 18 being held in place by a nut 19, and the piston rod also carries a rigid disc 20 which is nearly as large in diameter as the piston 14. The end 17 of the seal is firmly gripped between the end of the piston and the disc 20 and undesired flexing of the seal is thereby prevented. The body of the seal folds at 21 between the piston 14 and the cylinder 10, and the end of the seal is anchored to the cylinder 10 by an annulus 22 which is fastened to a stationary partition 23 secured inside the cylinder 10. This partition 23 is partly tubular anr it has an end wall which abuts against the annulus 22. Formed in this wall and in the annulus 22 are passages 24.

The piston rod 18 is formed with an enlargement 25 and abutting against that end of this enlargement which is remote from the piston 14 is another piston 26 which receives against its end face a part 27 of another cup-shaped flexible seal of the type above described. The part 27 of this seal is held in place against the end of the piston 26 by a disc 28 which is similar in function to the aforesaid disc 20. This disc 28 is itself held in place by a nut 29 screwed upon the piston rod 18. The seal, of which the end 27 forms a part, folds at 30 between the piston 26 and the cylinder 10, and the end of the seal is anchored to the cylinder 10 by an annulus 31 which is fastened to the valve block 11.

The partition 23 and the annulus 22 are bored to receive a tubular stem 32 of a damping cup 33, the open end of which will be entered by the enlargement 25 of the piston rod during the latter part of its forward movement. There is clearance between the inner face of the tubular stem 32 and the exterior of the piston rod 18. A spring 34 extends between the opposed faces of the partition 23 and of the piston 26.

The piston rod 18 has a longitudinal bore 35 which can be used to convey compressed air to a tool motor carried by the piston 14, if desired. This bore 35 communicates with the interior of the nut 29, which latter has an end wall into which is screwed a solid rod 36 in axial alignment with the piston rod 18. The parts are shown in FIGURE 2 with the piston assembly at the rearward end of its stroke. In this position, the end of the nut 29 is engaging the base of a recess in the valve block 11 and the disc 28 is engaging the annulus 31. When however, the piston assembly is moved forwardly from this position, there is a space between these two pairs of elements, 29, 11 and 28, 31, which space is in communication with the chamber 37 inside the right hand of the two seals. Moreover, this chamber 37 is in communication through passages 38 with the bore 35. Consequently, if there is compressed air in this chamber 37, it will be fed through the bore 35 when the piston assembly is moving forwardly, but it cannot be so fed when the parts are in the position shown in FIGURE 2 of the drawings.

Received within the valve block 11 is a sleeve valve 39 which is endwise movable. This controls the supply of compressed air from the main conduit 40 to the chamber 37 via the conduit shown in dotted lines at 41. Adjustable nuts 42 are mounted on the rod 36 and their arrangement is such that at the end of the desired forward stroke of the piston assembly, the leading nut 42 makes contact with the valve 39 and moves it endwise into a position to release the pressure in the chamber 37. The spring 34 then effects the return movement of the piston assembly. When this assembly reaches the end of its rearward stroke, the nut 29 or a part moving therewith, makes the contact with the valve 39 and moves it endwise into a position to admit compressed air to the chamber 37.

It will be appreciated that between the pistons 14 and 26 there is created a chamber 43 which is partly at one side of the partition 23 and partly at the other side thereof, the two chamber parts being connected through the passages 24, and through the clearance between the tubular stem 32 and the exterior of the piston rod 18. This chamber 43 is filled with oil. During the first part of the forward movement of the piston assembly, the oil is free to move readily through the passages 24 from the one side to the other of the partition 23, and consequently, the forward movement of the piston assembly is almost unhampered. However, towards the end of the forward stroke, the enlargement 25 enters the damping cup 33 and the oil which is trapped in the interior of the latter can only pass through the clearance between the tubular stem 32 and the exterior of the piston rod 18. Consequently the final forward movement of the piston assembly is damped. The return movement of the piston assembly which takes place under the impulse of the spring 34 is able to take place unhampered because the passages 24 will be operative.

If desired, the formation of the damping cup 33 may be changed in order to vary its damping effect. Moreover, the damping effect of the aforesaid clearance between the tubular stem 32 and the piston rod 18 may be varied by adopting the construction shown in FIGURE 4 in which a set screw 44 is provided which acts as a needle valve to control a vent passage 45 leading between the aforesaid clearance and one of the passages 24. The valve 44 can readily be given a setting adapted to ensure the appropriate control of the damping effect on the piston assembly during the end of its forward stroke.

It is to be understood that the invention is not restricted to the precise constructional details set forth.

I claim:
1. Machine tool feed apparatus comprising
   (a) a cylinder,
   (b) first and second piston heads and a piston rod, the heads being rigidly carried on the piston rod, constituting a piston assembly reciprocable in the cylinder,
   (c) first and second foldable cup-shaped seals each comprising, when unfolded, a circular end face, a conical portion tapering outwardly from the end face, and an outer annular flange, the seals connecting respectively the first and second piston heads to the cylinder,
   (d) the first piston head and seal constituting the wall of a first chamber to receive fluid pressure to urge the piston assembly in one direction lengthwise of the cylinder,
   (e) the first and second piston heads and seals constituting between them a second chamber which is filled with damping fluid,
   (f) a partition in the cylinder between the piston heads and arranged to permit the damping fluid to pass through it as the piston assembly reciprocates, and
   (g) means for effecting movement of the piston assembly in the cylinder in the direction opposite to the said one direction.

2. Machine tool feed apparatus according to claim 1,
   (a) a longitudinal bore in the piston assembly communicating with the first chamber,
   (b) a tool holder mounted on the piston assembly on the side of the second piston head remote from the first piston head, and
   (c) a pressure fluid connection in the tool holder in communication with the first chamber through the said bore.

3. Machine tool feed apparatus according to claim 1, the said means for effecting movement of the piston assembly in the said opposite direction comprising
   (a) a fixed abutment in the second chamber, and
   (b) a spring abutting the abutment and the first piston head and urging them apart.

4. Machine tool feed apparatus according to claim 1, comprising
   (a) a damping cup on the said partition,
   (b) an enlargement on the piston rod between the pistons, arranged to enter the damping cup in sealing relationship therewith during movement of the piston assembly in said one direction, and
   (c) a restricted outlet from the damping cup.

5. Machine tool feed apparatus according to claim 4, the said restricted outlet comprising
   (a) a bore in the partition, and
   (b) a needle valve in the bore.

6. Machine tool feed apparatus according to claim 1, comprising
   (a) valve means including a valve member movable longitudinally of the apparatus between first and second positions,
   (b) pressure fluid and exhaust connections,
   (c) the valve member in its first position connecting the said first space with the pressure fluid connection and in its second position connecting the first space with the exhaust connection,
   (d) a part connected to move with the piston assembly,
   (e) an abutment on the said part abutting the valve member when the piston assembly moves in the said other direction to move the valve member into its said first position, and (f) an adjustable abutment on the said part abutting the valve member when the piston assembly moves in the said one direction to move the valve member into its said second position.

References Cited in the file of this patent

UNITED STATES PATENTS

| | | |
|---|---|---|
| 1,750,634 | Forsberg | Mar. 18, 1930 |
| 1,850,619 | England | Mar. 22, 1932 |
| 2,013,665 | Messier | Sept. 10, 1935 |
| 2,090,575 | De Motte | Aug. 17, 1937 |
| 2,199,337 | Gartin | Apr. 30, 1940 |
| 2,580,751 | Fletcher | Jan. 1, 1952 |
| 2,631,573 | Levitt et al. | Mar. 17, 1953 |
| 2,674,098 | Taylor | Apr. 6, 1954 |
| 2,702,023 | Seeloff | Feb. 15, 1955 |
| 2,742,880 | Ball | Apr. 24, 1956 |
| 2,758,569 | Peterson | Aug. 14, 1956 |
| 2,803,195 | Lock | Aug. 20, 1957 |
| 2,838,140 | Rasmusson et al. | June 10, 1958 |
| 2,857,789 | Robinson | Oct. 28, 1958 |
| 2,884,903 | Pauly | May 5, 1959 |
| 2,895,494 | Adelson | July 21, 1959 |